(12) United States Patent
Kim et al.

(10) Patent No.: US 9,977,528 B2
(45) Date of Patent: May 22, 2018

(54) ELECTRONIC DEVICE HAVING TOUCH SENSOR

(71) Applicant: Samsung Electronics Co., Ltd., Gyeonggi-do (KR)

(72) Inventors: Jeonghun Kim, Gyeonggi-do (KR); Kyungjung Kim, Gyeonggi-do (KR); Changhyun Ahn, Gyeonggi-do (KR); Hyejeon Jung, Seoul (KR); Youngjoon Kim, Gyeonggi-do (KR); Gajin Song, Gyeonggi-do (KR); Bongjae Rhee, Gyeonggi-do (KR); Yujeong Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/273,204

(22) Filed: May 8, 2014

(65) Prior Publication Data

US 2014/0333554 A1    Nov. 13, 2014

(30) Foreign Application Priority Data

May 8, 2013    (KR) ........................ 10-2013-0052054

(51) Int. Cl.
*G06F 3/041*      (2006.01)
*G06F 1/16*      (2006.01)
(Continued)

(52) U.S. Cl.
CPC ............ *G06F 3/0416* (2013.01); *G06F 1/169* (2013.01); *G06F 1/1656* (2013.01); *G06F 3/041* (2013.01); *G06F 3/0436* (2013.01); *H04M 1/0254* (2013.01); *H04M 1/0262* (2013.01); *H04M 1/72575* (2013.01); *H04M 2250/22* (2013.01)

(58) Field of Classification Search
CPC combination set(s) only.
See application file for complete search history.

(56) References Cited

U.S. PATENT DOCUMENTS 5,909,102 A * 6/1999 Stone, III ............ H01M 2/1022
                                                         320/114
2006/0079188 A1* 4/2006 Chintala ..................... 455/90.3
(Continued)

FOREIGN PATENT DOCUMENTS

WO    WO 0173684 A1    10/2001
WO    WO 2004/008724 A1    1/2004

OTHER PUBLICATIONS

Extended European Search Report dated Aug. 14, 2014 in connection with European Application No. 14166849.1; 8 pages.

*Primary Examiner* — Jennifer Mehmood
*Assistant Examiner* — Sosina Abebe (57) ABSTRACT

An electronic device with a touch sensor includes a body mounted with an electronic element, and a cover detachably coupled to the body. The body includes a signal generating circuitry that generates an electric signal, a first antenna that transmits the electric signal, and a touch processing circuitry that processes a touch signal received through the first antenna. The cover includes a touch sensor that is driven by the electric signal and recognizes a touch, and a second antenna connected with the touch sensor. The second antenna receives the electric signal and transmits a touch signal sensed through the touch sensor unit.

20 Claims, 4 Drawing Sheets

(51) Int. Cl.
*H04M 1/02* (2006.01)
*G06F 3/043* (2006.01)
*H04M 1/725* (2006.01)

(56) References Cited

U.S. PATENT DOCUMENTS

| | | | |
|---|---|---|---|
| 2006/0176277 A1* | 8/2006 | Daniel | G06F 3/0317 345/163 |
| 2008/0096620 A1 | 4/2008 | Lee et al. | |
| 2010/0245265 A1* | 9/2010 | Sato et al. | 345/173 |
| 2011/0039141 A1* | 2/2011 | Zhang | H01M 2/1066 429/97 |
| 2011/0053653 A1* | 3/2011 | Tho et al. | 455/566 |
| 2011/0134300 A1* | 6/2011 | Chung | H04M 1/0254 348/333.01 |
| 2012/0007822 A1 | 1/2012 | Luo | |
| 2012/0032891 A1 | 2/2012 | Parivar | |
| 2012/0164858 A1* | 6/2012 | Kim | G06F 1/1626 439/148 |
| 2012/0236480 A1* | 9/2012 | Yoo | H04M 1/0262 361/679.01 |
| 2013/0267284 A1* | 10/2013 | Ryu | H04W 88/06 455/575.7 |
| 2013/0288747 A1* | 10/2013 | Shu | G06F 1/1698 455/558 |
| 2013/0300352 A1* | 11/2013 | Kuk | H02J 7/025 320/108 |
| 2014/0232607 A1* | 8/2014 | Lee | H01Q 1/526 343/841 |

\* cited by examiner

ELECTRONIC DEVICE HAVING TOUCH SENSOR

CROSS-REFERENCE TO RELATED APPLICATIONS AND CLAIM OF PRIORITY

The present application is related to and claims priority from and the benefit under 35 U.S.C. § 119(a) of Korean Patent Application No. 10-2013-0052054, filed on May 8, 2013, which is hereby incorporated by reference for all purposes as if fully set forth herein.

TECHNICAL FIELD

The present disclosure relates generally to an electronic device, and more particularly, to an electronic device having a touch sensor unit.

BACKGROUND

Electronic devices provide various functions required by users. For example, the electronic devices provide various functions such as a voice conversation function, a music playing function, a photographing function, and an internet connection. In order to allow a user to operate the various functions as described above, the electronic devices are provided with a touch screen that provides both a display function and an input function. For example, the user may execute an application program of an electronic device and perform a required function by touching the touch screen using a finger or a touch instrument. That is, after executing an application program, the function of the application program may be controlled by touching an icon, a menu, or the like that is displayed on the touch screen. Accordingly, a touch screen type electronic device provides convenience in executing an application program for the user as compared with a conventional keypad type electronic device. Due to such an advantage, electronic devices including a touch screen are increasing. In order to provide various input methods and improve the users' convenience, electronic devices that support rear touch have increased recently. When supporting such rear touch, the electronic device includes a touch sensor unit mounted on a battery cover and connected to a body using a wired cable (film cable).

However, when the touch sensor unit is connected to the body using a wired cable, there is a problem in that it is difficult to apply it to an electronic device which is provided with a detachable battery cover. Specifically, when the battery cover is removed, the wired cable may be cut or otherwise deteriorated, thereby causing trouble. In order to prevent such a problem, the electronic devices that support rear touch are generally formed in an integrated type from which the battery cover cannot be separated. That is, when the conventional wired cable type is employed, an electronic device provided with a detachable battery cover has a problem in that it is difficult to support the rear touch.

SUMMARY

To address the above-discussed deficiencies, it is a primary object to provide an electronic device with a touch sensor unit in which the sensor unit is mounted on a detachable cover case and connected with a body using a wireless or contact method.

According to an embodiment of the present disclosure, there is provided an electronic device that includes a body mounted with an electronic element, and a cover detachably coupled to the body. The body includes a signal generating circuitry that generates an electric signal, a first antenna that transmits the electric signal, and a touch processing unit that processes a touch signal received through the first antenna, and the cover includes a touch sensor that is driven by the electric signal and recognizes a touch, and a second antenna connected with the touch sensor unit, the second antenna receiving the electric signal and transmitting a touch signal sensed through the touch sensor.

According to another embodiment of the present disclosure, there is provided an electronic device including a body mounted with an electronic element, and a cover case detachably coupled to the body. The cover case includes a touch sensor that senses a user's touch, a first contact unit connected with a transmission unit of the touch sensor, and a second contact unit connected with a reception unit of the touch sensor. The body includes a first terminal that is contacted with the first contact unit when the cover case is coupled, a second terminal that is contacted with the second contact unit when the cover case is coupled, a signal generating circuitry that generates an electric signal transmitted through the first terminal and supplied to the touch sensor, and a touch processing circuitry that processes a touch signal received through the second terminal.

According to still another embodiment of the present disclosure, there is provided an electronic device that includes a body mounted with an electronic element, a battery cover detachably coupled to the body, a signal generating circuitry that generates an electric signal, a surface acoustic wave type touch module that recognizes a touch, the surface acoustic wave type touch module being mounted on the battery cover and driven by the electric signal, and a touch processing unit that processes a touch signal recognized by the surface acoustic wave type touch module, the touch processing unit being mounted on the body. The signal generating circuitry and the surface acoustic wave type touch module, and the surface acoustic wave type touch module and the touch processing circuitry are connected by a wireless method or a contact method.

As described above, an electronic device including a touch sensor according to the embodiment of the present disclosure is configured in such a manner that the touch sensor unit is mounted on the detachable cover, and connects the touch sensor and the body using a wireless or contact method, and the cover case may be freely detached. That is, the present disclosure may solve a problem of the prior art which makes it difficult to provide a rear touch in an electronic device having a detachable cover case.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, preferred embodiments of the present disclosure will be described in detail with reference to the accompanying drawings. It should be noted that the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Meanwhile, the exemplary embodiments disclosed in the specification and drawings are merely presented to easily describe technical contents of the present disclosure and help the understanding of the present disclosure and are not intended to limit the scope of the present disclosure. It is obvious to those skilled in the art to which the present disclosure pertains that other modified embodiments on the basis of the spirit of the present disclosure besides the embodiments disclosed herein can be carried out.

Prior to describing the present disclosure, an electronic device according to exemplary embodiments of the present disclosure is a terminal that includes a detachable case cover (for example, a battery cover) and can be a mobile communication terminal, a smart phone, a tablet Personal computer (PC), a hand-held PC, a Portable Multimedia Player (PMP), a Personal Digital Assistant (PDA), or the like.

Figure 1:
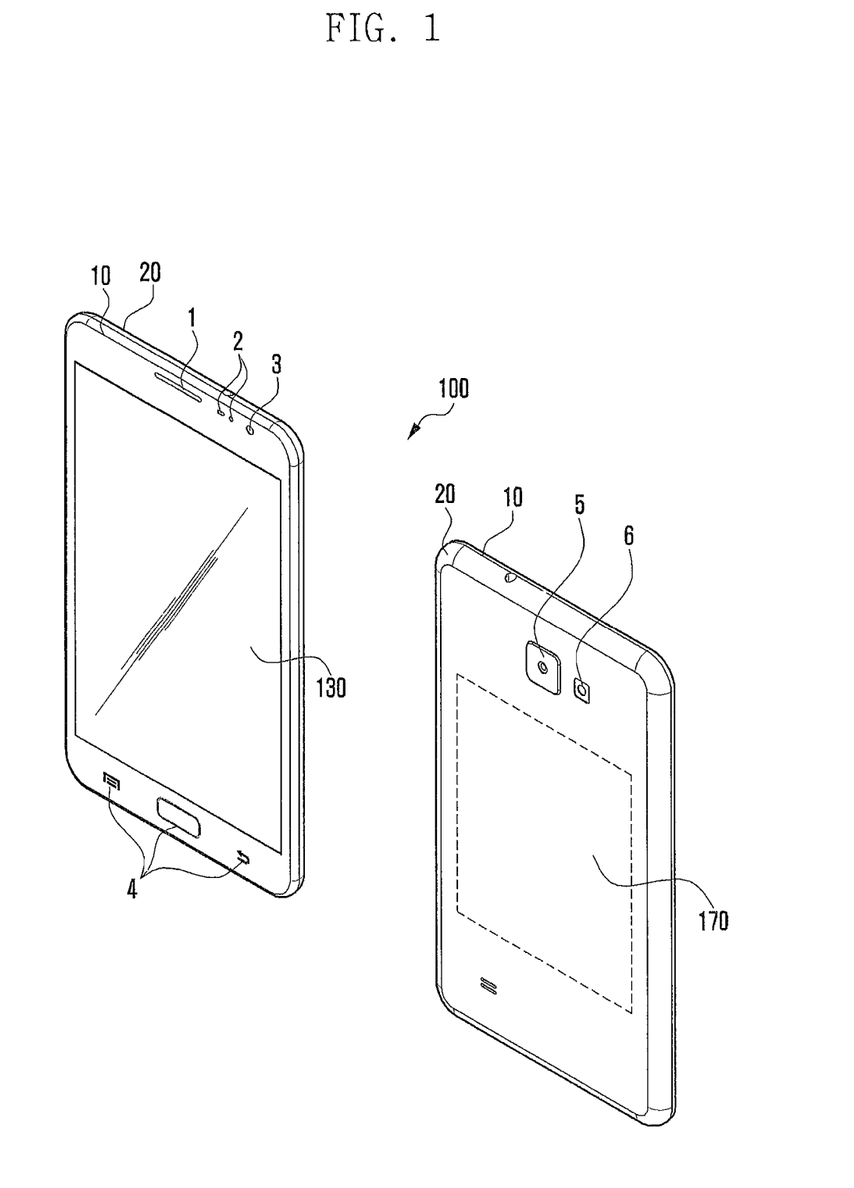
FIG. 1 illustrates an external appearance of an electronic device according to an embodiment of the present disclosure.

FIG. 1 illustrates an external appearance of an electronic device according to an exemplary embodiment of the present disclosure.

Referring to FIG. 1, an electronic device 100 according to an exemplary embodiment of the present disclosure is provided with a touch screen 130 on a front face thereof in which a speaker 1, an illumination sensor 2 and a first camera 3 can be positioned at an upper end of the touch screen 130, and a plurality of keys 4 can be positioned at a lower end of the touch screen 130. For example, the plurality of keys can be a menu key, a home key and a cancel key. A second camera 5 and a flash 6 can be positioned on the rear face of the electronic device 100.

The electronic device 100 configured as described above can include a body 10 and a cover case 20. The body 10 can be equipped with a plurality of electronic elements, a battery, etc. The cover case 20 can be detachably coupled to the body 10. The cover case 20 can be a battery cover that prevents the separation of the battery. On the internal face of the cover case 20, a touch sensor unit 170 that supports a rear touch function can be mounted. The touch sensor unit 170 can be a passive touch panel that receives an electric signal and transmits the received electric signal. The passive touch panel refers to a type that does not require a separate power supply. For example, the touch sensor unit 170 can be a Surface Acoustic Wave (SAW) type touch panel. Since such a SAW type touch panel is apparent to those having an ordinary skill in the art, a detailed description thereof will be omitted. The touch sensor unit 170 can be connected with an electronic element of the body 10 (for example, a touch processing circuitry or a signal generating circuitry) through a wireless or contact method. The wireless or contact type connection structure will be described below with reference to FIGS. 3 and 4.

Figure 2:
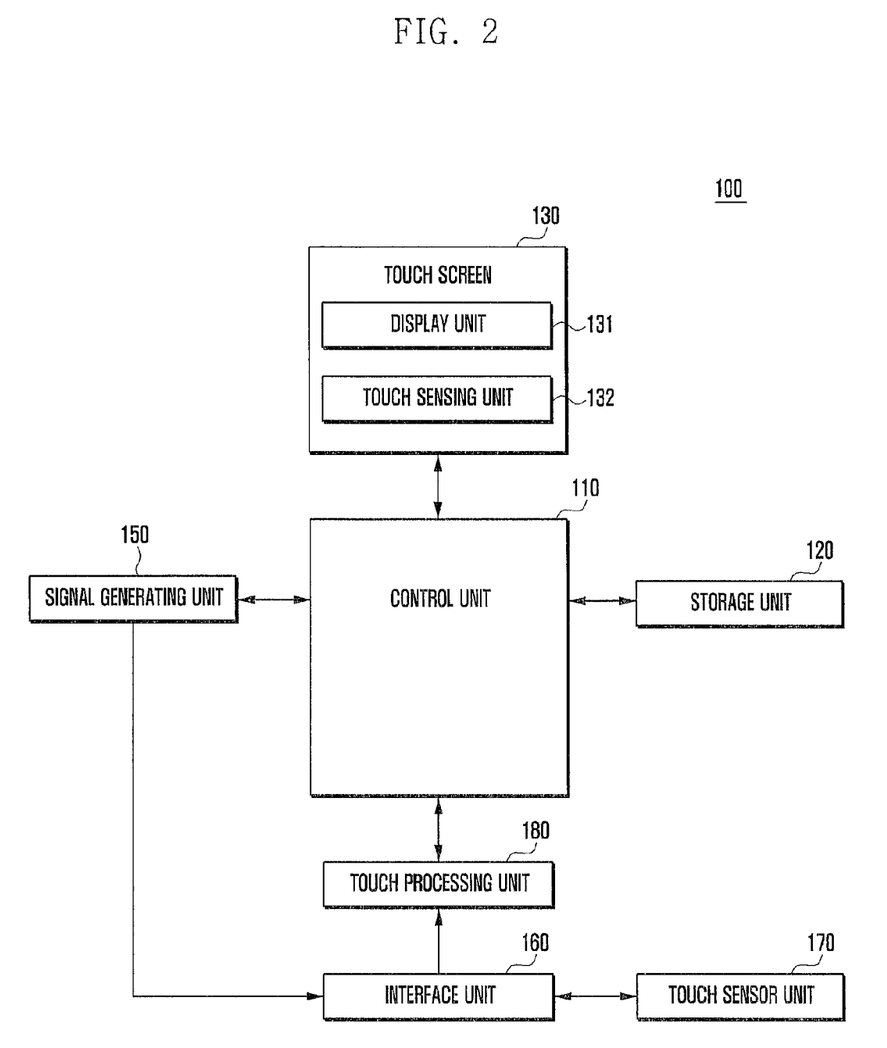
FIG. 2 is a block diagram schematically illustrating a configuration of an electronic device according to an embodiment of the present disclosure.
Figure 3:
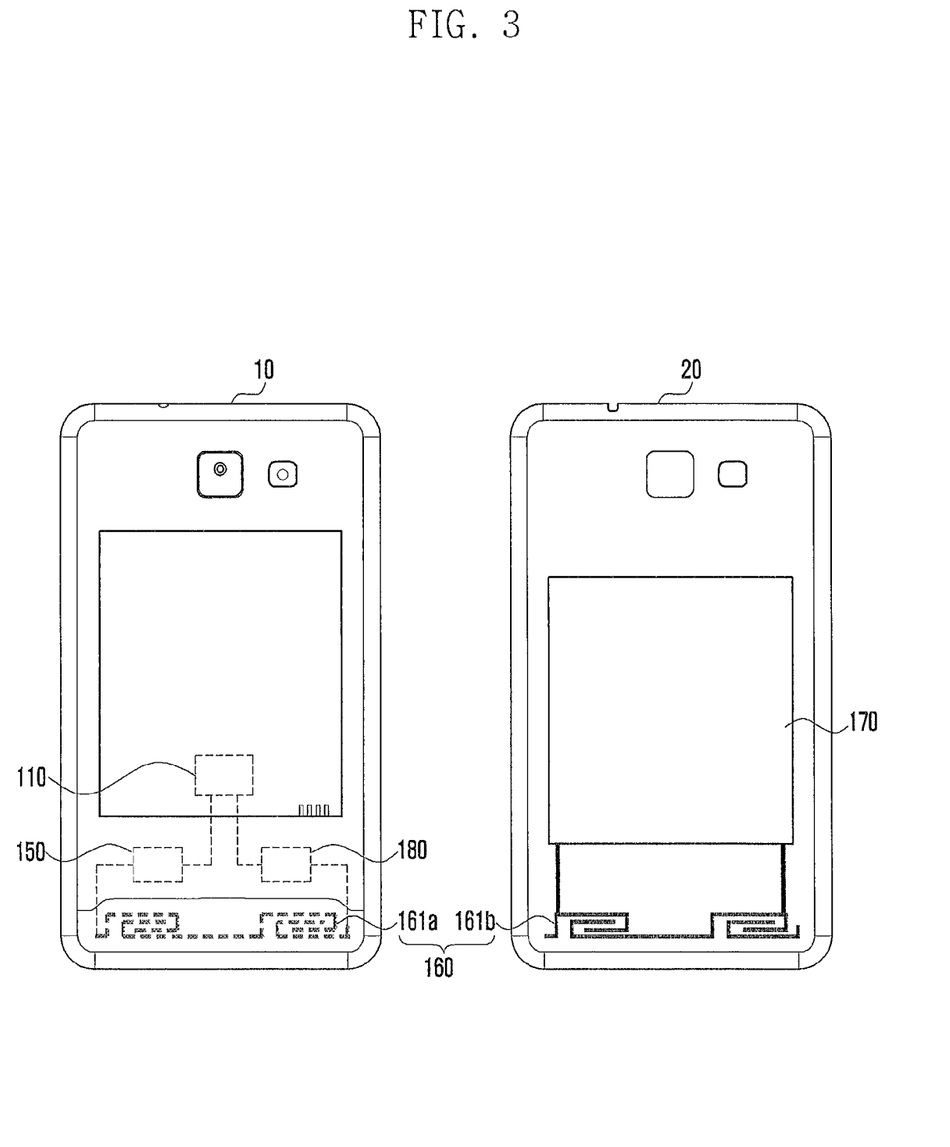
FIG. 3 illustrates a connection structure of a touch sensor unit using a wireless method according to a first embodiment of the present disclosure.
Figure 4:
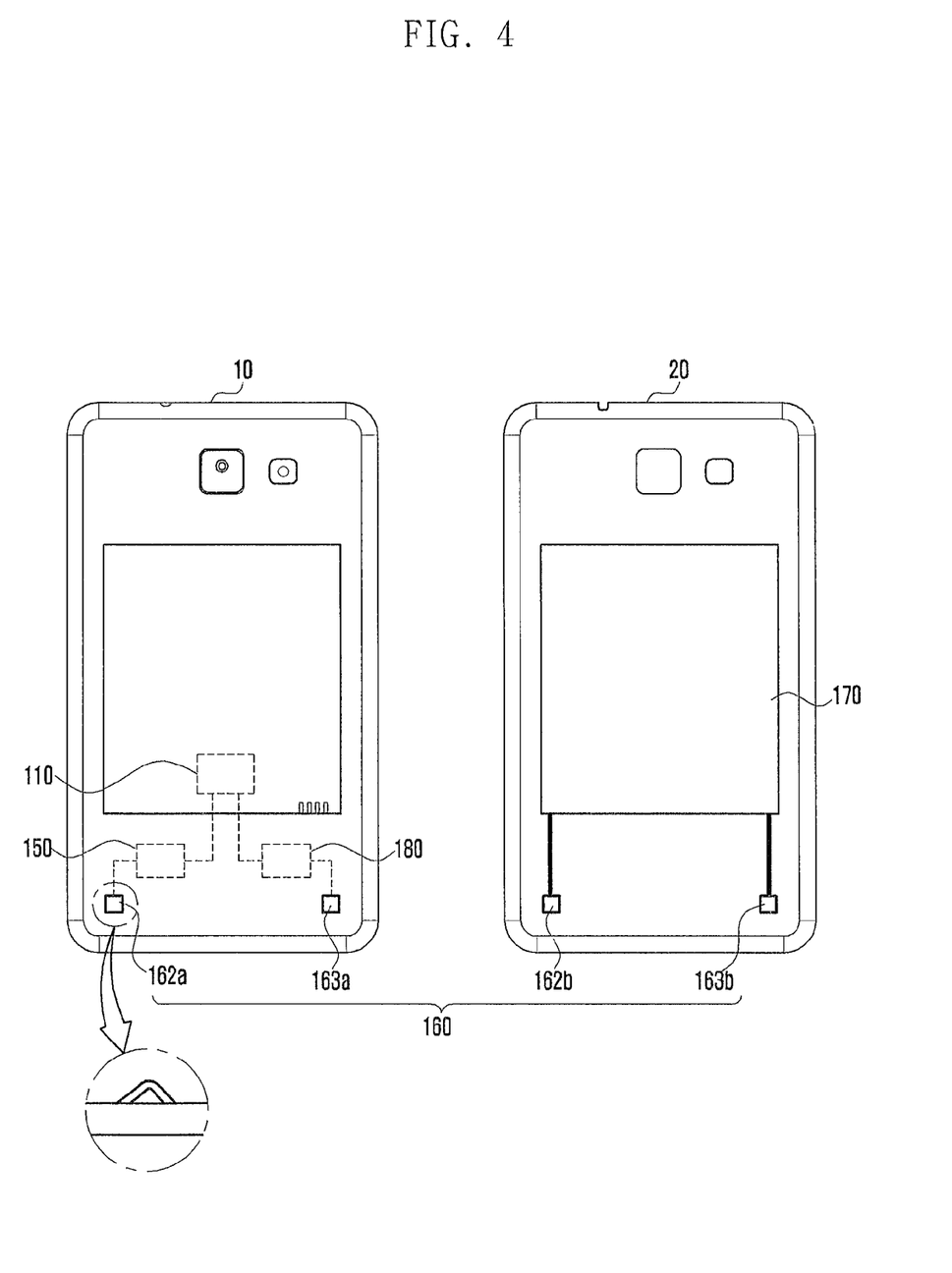
FIG. 4 is a view for describing a connection structure of a touch sensor unit using a contact method according to a second embodiment of the present disclosure.

FIG. 2 is a block diagram schematically illustrating a configuration of an electronic device according to an exemplary embodiment of the present disclosure, FIG. 3 is a view for describing a connection structure of a touch sensor unit using a wireless method according to a first exemplary embodiment of the present disclosure, and FIG. 4 is a view for describing a connection structure of a touch sensor unit using a contact method according to a second exemplary embodiment of the present disclosure.

Referring to FIGS. 2 to 4, an electronic device 100 according to an exemplary embodiment of the present disclosure can include a control unit 110, a storage unit 120, a touch screen 130, a signal generating unit 150, an interface unit 160, a touch sensor unit 170, and a touch processing unit 180. To this end, the touch screen 130 can include the display unit 131 and the touch detection unit 132.

The electronic device 100 configured as described above according to the present disclosure is characterized by the fact that the touch sensor unit 170 is mounted on the cover case 20 and connected to the body 10 using the wireless or contact method in order to support a rear touch function. Hereinafter, each component of the electronic device 100 for supporting the above-described functions will be described in detail.

The touch screen 130 can perform an input function and a display function. To this end, the touch screen 130 can include the display unit 131 and the touch detection unit 132.

The display unit 131 displays various menus of the electronic device 100, information input by the user, or information to be provided to the user. The display unit 131 can be formed by a Liquid Crystal Display (LCD), an Organic Light Emitted Diode (OLED), or an Active Matrix Organic Light Emitted Diode (AMOLED). The display unit 131 can provide various screens for use of the electronic device 100, which include, for example, a home screen, a menu screen, and a phone-call screen.

The touch detection unit 132 is a device for providing an input function and can generate a touch event and transmit the generated touch event to the controller 110 when a touch input device, such as a user's finger, a stylus, or an electronic pen, contacts or approaches the touch detector. Specifically, the touch sensing unit 132 can recognize occurrence of a touch event through a change of a physical characteristic (for example, an electrostatic capacitance, a resistance value, or the like) according to contact or proximity of a touch input device, and transmit the touch event to the control unit 110. The touch detection unit 132 as described above is obvious to those skilled in the art, so a detailed description thereof is omitted here.

The signal generating unit 150 can generate an electric signal (for example, an impulse signal) under the control of the control unit 110. The electric signal is supplied to the touch sensor unit 170 through the interface unit 160.

The interface unit 160 can provide an electric signal input from the signal generating unit 150 to the touch sensor unit 170, receive a reflected signal from the touch sensor unit 170, and transmit the reflected signal to the touch processing unit 180. For this purpose, the interface unit 160 can have a connection structure of a wireless method (first exemplary embodiment) or a contact method (second exemplary embodiment).

Specifically, the interface unit 160 according to the first exemplary embodiment of the present disclosure can be configured by a first antenna 161a mounted on the body 10 and a second antenna 161b mounted on the cover case 20 as illustrated in FIG. 3. The first antenna 161a and the second antenna 161b can transmit or receive a signal. For example, the first antenna 161a can transmit an electric signal of the signal generating unit 150 to the second antenna 161b and receive a reflected signal from the second antenna 161b. On the contrary, the second antenna 161b can receive an electric signal from the first antenna 161a and transmit a reflected signal to the first antenna 161a. In this manner, the first exemplary embodiment of the present disclosure can transmit an electric signal and a reflected signal by a wireless method. The wireless method can be Ultra Wide Band (UWB), Near Field Communication (NFC), or the like.

In FIG. 3, the second antenna 161b is illustrated as being exposed to the outside. However, the second antenna 161b may not be exposed to the outside. For example, a protective film can be attached to the cover case 20.

Meanwhile, the interface unit 160 according to the second exemplary embodiment of the present disclosure can be configured by a first terminal 162a and a second terminal 163a mounted on the body 10, and a first contact unit 162b and a second contact unit 163b mounted on the cover case 20 as illustrated in FIG. 4.

The first terminal 162a and the second terminal 163a are elastic conductive terminals (for example, metal terminals) which can protrude to the outside as illustrated in the enlarged view.

The first terminal 162a is connected to the signal generating unit 150 and the second terminal 163a is connected to the touch processing unit 180. In addition, the first terminal 162a and the second terminal 163a can be contacted with the first contact unit 162b and the second contact unit 163b, respectively, when the cover case 20 is coupled to the body 10.

The first contact unit 162b and the second contact unit 163b are positioned on the cover case 20 and can be conductive pads (for example, metal pads) of a specific shape (for example, a rectangular shape). The first contact unit 162b can be connected with a transmission unit (not illustrated) of the touch sensor unit 170 and the second contact unit 163b can be connected with a reception unit (not illustrated) of the touch sensor unit 170. The transmission unit of the touch sensor unit 170 can convert an electric signal received from the signal generating unit 150 into a surface acoustic wave and transmit the surface acoustic wave. The reception unit of the touch sensor unit 170 can receive a reflected signal to the signal transmitted from the transmission unit.

The touch sensor unit 170 can sense (recognize) a user's touch. The touch sensor unit 170 is mounted on the cover case 20. For example, the touch sensor unit 170 can be mounted on the inner surface of the cover case 20 through at least one of adhesion, molding, engraving, and injection molding. That is, the present embodiment of the present disclosure can recognize the user's rear touch through the touch sensor unit 170.

The touch sensor unit 170 can be a Surface Acoustic Wave (SAW) type touch panel. The SAW type touch panel converts an impulse signal transmitted from the signal generating unit 150 into a surface acoustic wave, and transmits the converted surface acoustic wave through transmission terminals. The SAW type touch panel can receive a reflected signal to the transmitted surface acoustic wave through reception terminals, convert the received surface acoustic wave into an electric signal, and transmit the electric signal to the touch processing unit 180 through the interface unit 160. Meanwhile, the SAW type touch panel can be formed in a passive type that does not require a separate power supply. Accordingly, the present exemplary embodiment of the present disclosure does not require a separate power supply unit that drives the touch sensor unit 170 on the cover case 20. Since the SAW type touch panel is well-known in the art, a detailed description thereof will be omitted.

Although, in FIGS. 3 and 4, the touch sensor unit 170 is illustrated as being mounted on the inner surface of the cover case 20 to be exposed to the outside, the touch sensor unit 170 can be mounted not to be exposed to the outside.

In addition, although the touch sensor unit 170 is illustrated as being mounted on the inner surface of the cover case 20, the present disclosure is not limited to this. For example, the touch sensor unit 170 can be mounted on the outer surface of the cover case 20. Alternatively, in other exemplary embodiments of the present disclosure, a part of the cover case 20 can be removed and the touch sensor unit 170 can be coupled to the removed portion.

The touch processing unit 180 can process an electric signal transmitted from the touch sensor unit 170 and transmit the result to the control unit 110.

The storage unit 120 can store an Operating System (OS) of the electronic device 100 and application programs necessary for other optional functions, such as a sound reproduction function, an image or video reproduction function, and a broadcast reproduction function. In addition, the storage unit 120 can store various data, for example, a video file, a game file, a music file, and a movie file. The storage unit 120 according to the present exemplary embodiment can store an application program that controls the driving of the electronic device 100 according to at least one of a front touch input through the touch sensing unit 132 and a rear touch input through the touch sensor unit 170.

The controller 110 can control general operations of the electronic device 100 and a signal flow between internal blocks of the electronic device 100, and can perform a data processing function for processing data. For example, the controller 110 can be configured by a Central Processing Unit (CPU), an application processor, etc. The controller 110 can be configured by a single core processor or a multi-core processor. The control unit 110 can process a touch input received from the touch sensing unit 132 and/or the touch processing unit 180. In addition, the control unit 110 can control the signal generating unit 150. Specifically, the control unit 110 can control the signal generating unit 150 to generate a signal at a predetermined period when the cover case 20 is fastened. Alternatively, the control unit 110 can control the signal generating unit 150 to generate a signal only at a specific situation (mode) that requires rear touch recognition. For example, the control unit 110 can control the signal generating unit 150 to generate a signal for a video reproducing mode, a broadcasting watching mode or the like. This is to reduce current consumption.

Meanwhile, although not illustrated in FIG. 2, the electronic device 100 can selectively further include components having additional functions such as a Global Positioning System (GPS) module for receiving position information, a broadcasting receiving module for receiving a broadcasting, a digital sound reproducing module such as an MP3 module, and an internet communication module that performs an Internet function (for example a Wi-Fi communication module), etc. While all components cannot be listed since they can be variously modified according to the convergence trend of digital devices, the electronic device 100 according to the present disclosure can further include components at the equivalent level to the above listed components. Electronic devices having a touch sensor unit according to the exemplary embodiments of the present disclosure have been described above with reference to the drawings and specific terms have been used. However, the description and terms have been used in a general meaning merely to easily describe the technical contents of the present disclosure and to help the understanding of the present disclosure. The present disclosure is not limited to the exemplary embodiments as described above. That is, it is apparent to those skilled in the art that other various embodiments based on the technical idea of the present disclosure can be implemented.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device including a body and a detachable battery cover comprising:
   the body having an open back side into which a device battery to directly provide power to the electronic device is installed, the open back side being covered by a detachable battery cover; and
   the detachable battery cover configured to cover the device battery in order to prevent the device battery from being separated from the body, and to further cover the open back side of the body of the electronic device by detachably attaching to the body, the detachable battery cover comprising:
   a touch sensor on an internal surface of the detachable battery cover, that is configured to recognize a touch input on the detachable battery cover; and
   a second antenna located on the internal surface of the detachable battery cover and coupled to the touch sensor, the second antenna configured to transmit a wireless signal corresponding to the touch input,
   wherein the body further comprises:
   a first antenna configured to receive the wireless signal from the second antenna; and
   a processing circuitry configured to obtain the touch input from the wireless signal and process the touch input.

2. The electronic device of claim 1, wherein the touch sensor is a passive touch panel configured to receive an electric signal through the second antenna and transmit a reflected signal to the received electric signal through the second antenna.

3. The electronic device of claim 1, wherein the touch sensor is a touch panel configured to use a surface acoustic wave.

4. The electronic device of claim 1, wherein the touch sensor is mounted on the detachable battery cover through at least one of adhesion, molding, engraving and injection molding.

5. The electronic device of claim 1, wherein the detachable battery cover is a battery cover covering a rear face of the electronic device.

6. The electronic device of claim 1, wherein the body further comprises a touch screen mounted on a front face thereof.

7. The electronic device of claim 6, further comprising:
   a controller configured to process a touch input signal generated from the touch screen and the processing circuitry.

8. An electronic device including a body and a detachable battery cover comprising:
   the body having an open back side into which a device battery to directly provide power to the electronic device is installed, the open back side being covered by a detachable battery cover; and
   the detachable battery cover configured to cover the device battery in order to prevent the device battery from being separated from the body, and to further cover the open back side of the electronic device by detachably attaching to the electronic device, the detachable battery cover comprising:
   a touch sensor on an internal surface of the detachable battery cover, that is configured to sense a user's touch input on the detachable battery cover;
   a first contact connected with a transmission unit of the touch sensor; and
   a second contact connected with a reception unit of the touch sensor,
   wherein the body comprises:
   a first terminal configured to be contacted with the first contact when the detachable battery cover is attached on the body coupled;
   a second terminal configured to be contacted with the second contact when the cover case is attached on the body; and
   a processing circuitry configured to obtain the touch input through the first terminal and process the touch input.

9. The electronic device of claim 8, wherein the first terminal and the second terminal are elastic conductive terminals.

10. The electronic device of claim 8, wherein the first contact and the second contact are conductive pads.

11. The electronic device of claim 8, wherein the touch sensor is a passive touch panel configured to receive an electric signal through the first contact and transmit a reflected signal to the received electric signal through the second contact.

12. The electronic device of claim 8, wherein the touch sensor is a touch panel configured to use a surface acoustic wave.

13. The electronic device of claim 8, wherein the touch sensor is mounted on the detachable battery cover through at least one of adhesion, molding, engraving and injection molding.

14. The electronic device of claim 8, wherein the detachable battery cover is a battery cover coupled to a rear face of the electronic device.

15. The electronic device of claim 8, wherein the detachable battery cover further includes a touch screen mounted on a front face thereof.

16. The electronic device of claim 15, further comprising:
a controller configured to process a touch input of the touch screen and touch processing circuitry.

17. An electronic device including a body and a detachable battery cover comprising:
the body having an open back side into which a device battery to directly provide power to the electronic device is installed, the open back side being covered by a detachable battery cover; and
the detachable battery cover configured to cover the device battery in order to prevent the device battery from being separated from the body, and to further cover the open back side of the body of the electronic device by detachably attaching to the body, the detachable battery cover comprising:
a signal generating circuitry configured to generate an electric signal; and
a touch sensor configured to recognize a touch input, the touch sensor mounted on an internal surface of the detachable battery cover and driven by the electric signal,
wherein the body further comprises:
a processing circuitry configured to process the touch input recognized by the touch sensor, the touch processing circuitry being mounted on the body,
wherein the signal generating circuitry and the touch sensor, and the touch sensor and the processing circuitry are connected by a wireless method or a contact method.

18. The electronic device of claim 17, wherein the touch sensor is a surface acoustic wave type touch sensor.

19. The electronic device of claim 17, wherein the cover comprises:
a first contact connected with a transmission unit of the touch sensor; and
a second contact connected with a reception unit of the touch sensor.

20. The electronic device of claim 19, wherein the body comprises:
a first terminal configured to be contacted with the first contact when the detachable battery cover is coupled to the body; and
a second terminal configured to be contacted with the second contact when the detachable battery cover is coupled to the body.

* * * * *